(12) United States Patent
Park et al.

(10) Patent No.: US 12,527,824 B2
(45) Date of Patent: Jan. 20, 2026

(54) **STRAIN OF *BIFIDOBACTERIUM ANIMALIS* SUBSP. LACTIS HEM20-01 AND COMPOSITION FOR TREATING DEPRESSION, COMPRISING THE SAME OR ITS CULTURE FLUID**

(71) Applicant: HEM PHARMA INC., Pohang-si (KR)

(72) Inventors: So Young Park, Suwon-si (KR); Yo Sep Ji, Suwon-si (KR)

(73) Assignee: HEM PHARMA INC., Pohang-si (KR)

( * ) Notice: Subject to any disclaimer, the term of this patent is extended or adjusted under 35 U.S.C. 154(b) by 346 days.

(21) Appl. No.: 18/259,441

(22) PCT Filed: Dec. 14, 2021

(86) PCT No.: PCT/KR2021/018915
§ 371 (c)(1),
(2) Date: Jun. 27, 2023

(87) PCT Pub. No.: WO2022/145807
PCT Pub. Date: Jul. 7, 2022

(65) Prior Publication Data
US 2024/0058396 A1 Feb. 22, 2024

(30) Foreign Application Priority Data
Dec. 28, 2020 (KR) ........................ 10-2020-0184265

(51) Int. Cl.
| | | |
|---|---|---|
| *A61K 35/745* | (2015.01) | |
| *A61K 35/00* | (2006.01) | |
| *A61P 25/24* | (2006.01) | |
| *C12N 1/20* | (2006.01) | |
| *C12R 1/01* | (2006.01) | |

(52) U.S. Cl.
CPC ............ *A61K 35/745* (2013.01); *A61P 25/24* (2018.01); *C12N 1/205* (2021.05); *A61K 2035/115* (2013.01); *C12R 2001/01* (2021.05)

(58) Field of Classification Search
CPC . A61K 35/745; A61K 2035/115; A61P 25/24; C12N 1/205; C12R 2001/01
See application file for complete search history.

(56) References Cited

FOREIGN PATENT DOCUMENTS

| KR | 100942290 B1 | 2/2010 |
|---|---|---|
| KR | 1020120015335 A | 2/2012 |
| KR | 101611832 B1 | 4/2016 |
| KR | 1020170129718 A | 11/2017 |
| KR | 1020190038451 A | 4/2019 |
| KR | 102040117 B1 | 11/2019 |
| KR | 102074384 B1 | 2/2020 |
| KR | 102136346 B1 | 7/2020 |
| KR | 102215599 B1 | 2/2021 |
| WO | 2017160711 A1 | 9/2017 |
| WO | 2019232513 A1 | 12/2019 |

OTHER PUBLICATIONS

Chun Yang et al., "Bifidobacterium in the gut microbiota confer resilience to chronic social defeat stress in mice", Scientific Reports, vol. 7, Article No. 45942, 2017, pp. 1-7.
Vlainic, Josipa et al. Probiotics as an adjuvant therapy in major depressive disorder. Current Neuropharmacology. 2016, vol. 14, pp. 952-958.

*Primary Examiner* — Robert A Zeman
(74) *Attorney, Agent, or Firm* — NKL Law; Jae Youn Kim

(57) ABSTRACT

The present disclosure relates to a strain of *Bifidobacterium animalis* subsp. *lactis* HEM20-01 (KCTC14143BP) and a composition for treating, preventing or alleviating depression, comprising the same.
A strain of *Bifidobacterium animalis* subsp. *lactis* HEM20-01 (KCTC14143BP) according to an embodiment of the present disclosure can treat or prevent depression by reducing corticosterone, endotoxin and pro-inflammatory cytokines. Therefore, the strain can be applied to pharmaceutical compositions, food compositions, health functional food compositions, and the like for treating or preventing depression.

3 Claims, 15 Drawing Sheets

ELEVATED PLUS MAZE TEST

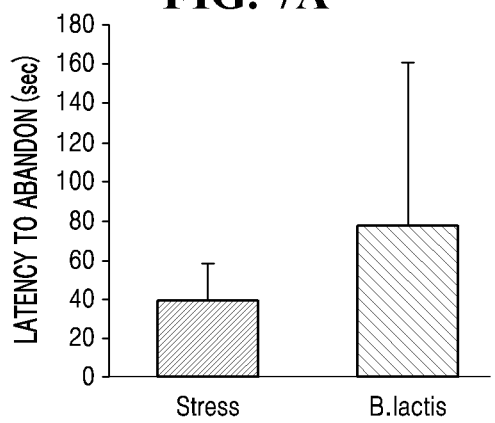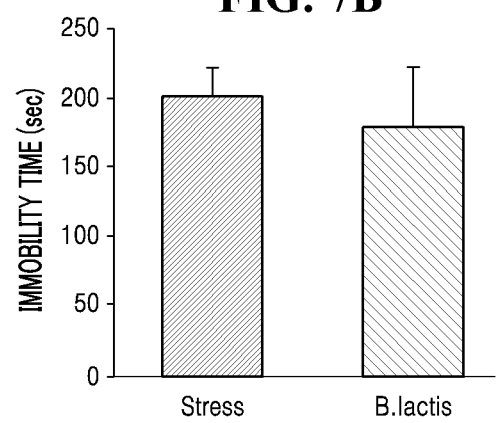
FIG. 7A FORCED SWIM TEST FIG. 7B

TIGHT JUNCTION PROTEIN LEVEL IN DISTAL ILEUM (INTESTINAL PERMEABILITY)

TIGHT JUNCTION PROTEIN LEVEL IN COLON (INTESTINAL PERMEABILITY)

INFLAMMATORY MARKER IN DISTAL ILEUM

INFLAMMATORY MARKER IN COLON

PROTEIN LEVEL OF INFLAMMATORY MARKER IN HIPPOCAMPUS

STRAIN OF *BIFIDOBACTERIUM ANIMALIS* SUBSP. LACTIS HEM20-01 AND COMPOSITION FOR TREATING DEPRESSION, COMPRISING THE SAME OR ITS CULTURE FLUID

TECHNICAL FIELD

The present disclosure relates to a strain of *Bifidobacterium animalis* subsp. *lactis* HEM20-01 (KCTC14143BP) and a composition for treating or preventing depression, comprising the same.

BACKGROUND

Major depressive disorder (depression) is currently the leading cause of disability worldwide, and is expected to surpass heart diseases and rank as the first cause of the burden of disease worldwide by 2030 (Reddy, 2010; Tucci and Moukaddam, 2017).

In this regard, a potential causal relationship between gut microbiota and major depressive disorder has recently been reported. It is known that the gut microbiota is actively involved in communication pathways among the nervous, immune, and endocrine systems, and the concept of microbiota-gut-brain (MGB) axis has been established as an important basis for research on major depressive disorder (Sherwin et al., 2016; Thursby and Juge, 2017; van de Guchte et al., 2018).

According to previous research, it was reported that the gut microbiota of patients with major depressive disorder had a different profile from those of healthy people. *Faecalibacterium, Bifidobacterium, Lactobacillus* and *Dialister* genera are known to decrease in patients with major depressive disorder and *Clostridium, Streptococcus, Klebsiella, Oscillibacter* and *Allistipes* genera are known to increase. Also, it has been reported that when fecal microbiota of a patient with major depressive disorder was transplanted into germ-free mice, the mice significantly showed depression-related behaviors compared to the mice transplanted with fecal microbiota of a healthy person (Kelly et al. al., 2016; Zheng et al., 2016). Accordingly, there has been an emphasis on addressing major depressive disorder from the perspective of the MGB axis with a focus on the gut microbiota.

Particularly, many preclinical and clinical studies are being conducted to treat major depressive disorder by regulating the MGB axis with probiotics. In this regard, probiotics have been reported to have an antidepressant effect several times. The production of gut-derived neurotransmitters as a result of administration of probiotics, the improvement of intestinal function and enhancement of production of gut-derived neurohormones caused by production of butyrate, anti-inflammatory and immune actions of bacteria-derived proteins have been reported (Yong et al., 2020).

Particularly, in a previous clinical study, 40 healthy adult males and females (control group: 20, test group: 20) were administered with strain-mixed powder (5×109 CFU) including *B. animalis* spp. *lactis* for 4 weeks and then requested to self-report depression and anxiety feelings they had when they thought of sad things (Leiden Index of Depression Sensitivity-Revised, LEIDS-R), and it was confirmed that aggression and rumination significantly decreased in the group administered with the strain-mixed powder (Steenbergen et al., 2015).

As a result of a study on a composition for treating depression, a composition comprising *Bifidobacterium bifidum* (Korean Patent Laid-open Publication No. 10-2017-0129718) and the like have been disclosed. However, there is a continuing need in the art for development and research of a composition highly effective in treating or preventing depression.

Accordingly, the present inventors have made extensive efforts to develop a composition highly effective in treating or preventing depression, and have completed the present disclosure by discovering a novel strain that reduces corticosterone, endotoxin and pro-inflammatory cytokines.

DISCLOSURE OF THE INVENTION

Problems to be Solved by the Invention

The present disclosure is to provide a strain of *Bifidobacterium animalis* subsp. *lactis* HEM20-01 (KCTC14143BP) and a composition for treating or preventing depression, comprising the strain.

However, the problems to be solved by the present disclosure are not limited to the above-described problems. Although not described herein, other problems to be solved by the present disclosure can be clearly understood by a person with ordinary skill in the art from the following descriptions.

Means for Solving the Problems

A first aspect of the present disclosure provides a strain of *Bifidobacterium animalis* subsp. *lactis* HEM20-01 (KCTC14143BP).

A second aspect of the present disclosure provides a food composition for preventing or alleviating depression, comprising a strain of *Bifidobacterium animalis* subsp. *lactis* HEM20-01 (KCTC14143BP) or its culture fluid as an active ingredient.

A third aspect of the present disclosure provides a pharmaceutical composition for treating or preventing depression, comprising a strain of *Bifidobacterium animalis* subsp. *lactis* HEM20-01 (KCTC14143BP) or its culture fluid as an active ingredient.

Effects of the Invention

A strain of *Bifidobacterium animalis* subsp. *lactis* HEM20-01 (KCTC14143BP) according to an embodiment of the present disclosure can treat or prevent depression by reducing corticosterone, endotoxin and pro-inflammatory cytokines. Therefore, the strain can be applied to food compositions, health functional food compositions, pharmaceutical compositions, and the like for treating or preventing depression.

BRIEF DESCRIPTION OF THE DRAWINGS

FIGS. 7A-B show the results of forced swim tests to confirm the ability to alleviate depression-related behaviors.

BEST MODE FOR CARRYING OUT THE INVENTION

Figure 1:
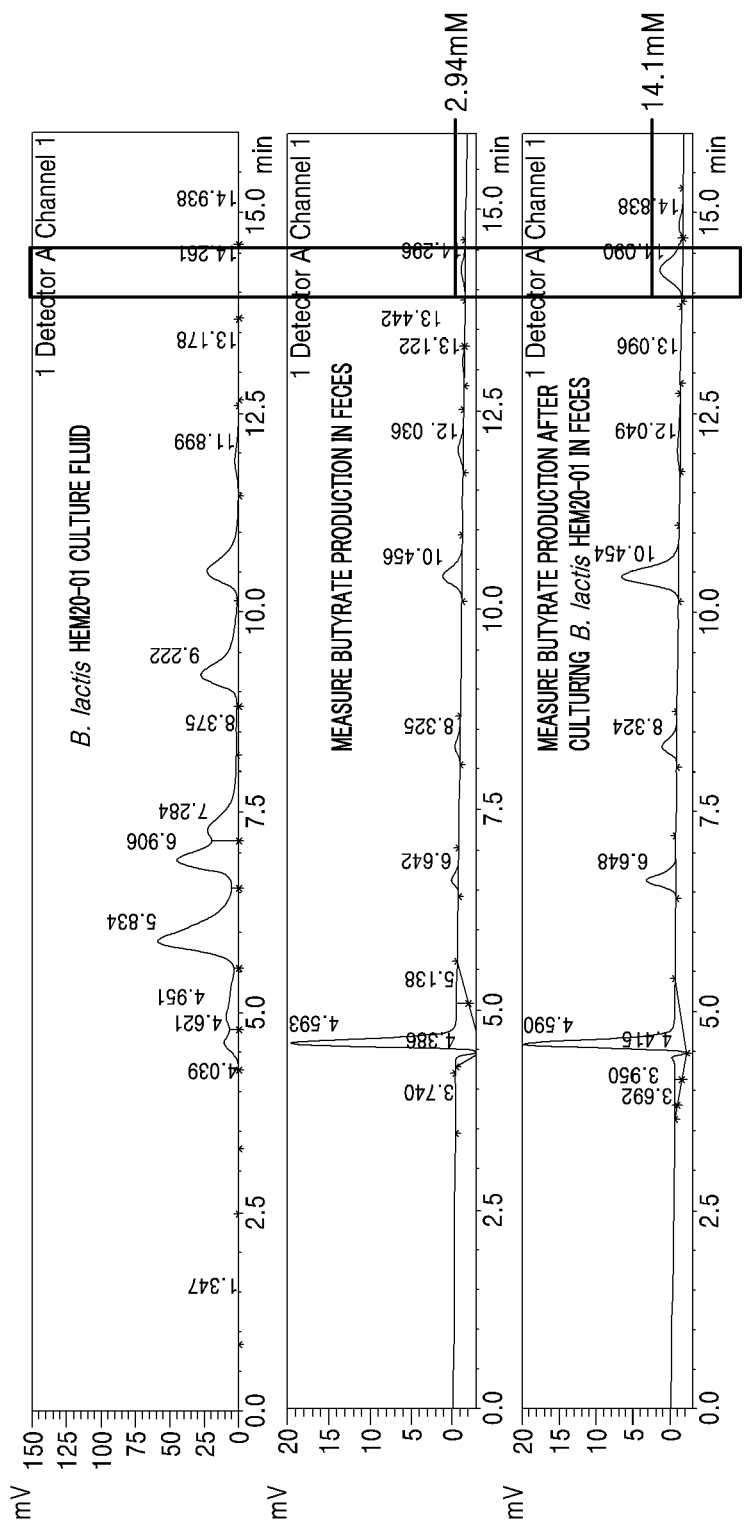
FIG. 1 shows the results of tests to confirm the ability to promote production of butyrate by treatment with a strain of *Bifidobacterium animalis* subsp. *lactis* HEM20-01.
Figure 2A:
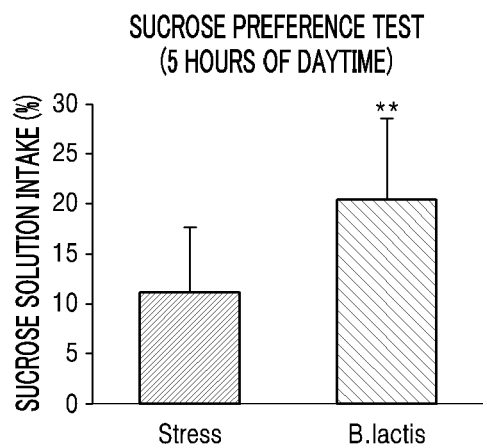
FIGS. 2A-2D show the results of sucrose preference tests to confirm the ability to alleviate depression-related behaviors.
Figure 2B:
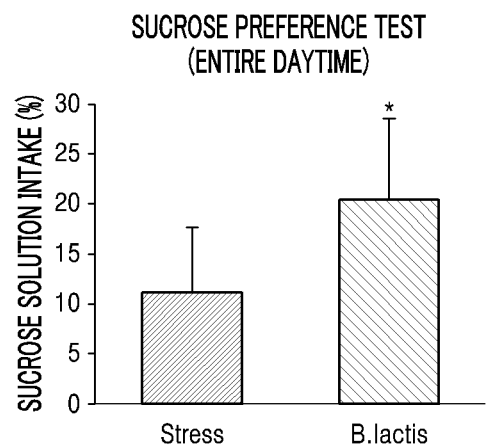
Figure 2C:
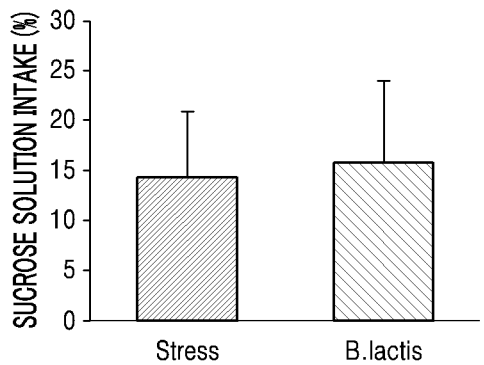
Figure 2D:
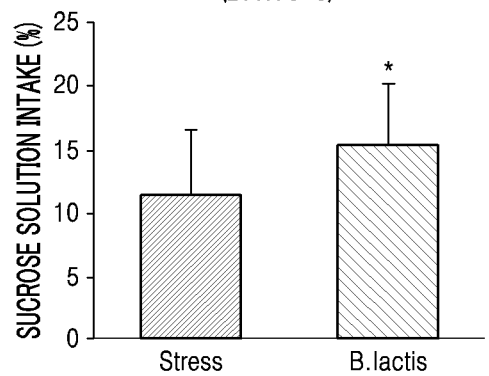

Hereinafter, example embodiments will be described in detail with reference to the accompanying drawings so that the present disclosure may be readily implemented by a person with ordinary skill in the art. However, it is to be noted that the present disclosure is not limited to the example embodiments but can be embodied in various other ways. In the drawings, parts irrelevant to the description are omitted for the simplicity of explanation, and like reference numerals denote like parts through the whole document.

Through the whole document, the term "on" that is used to designate a position of one element with respect to another element includes both a case that the one element is adjacent to the other element and a case that any other element exists between these two elements.

Through the whole document, the term "comprises or includes" and/or "comprising or including" used in the document means that one or more other components, steps, operation and/or existence or addition of elements are not excluded in addition to the described components, steps, operation and/or elements unless context dictates otherwise. Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

Through the whole document, the term "combination(s) of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A or B, or A and B".

Hereinafter, embodiments and examples of the present disclosure will be described in detail with reference to the accompanying drawings. However, the present disclosure may not be limited to the following embodiments, examples, and drawings.

A first aspect of the present disclosure provides a strain of *Bifidobacterium animalis* subsp. *lactis* HEM20-01 (KCTC14143BP).

In an embodiment of the present disclosure, the strain may reduce corticosterone, specifically, blood corticosterone levels in a basal state.

Through the whole document, the term "corticosterone" is a kind of adrenocortical hormone, and is a stress hormone secreted from the adrenal cortex by the action of hypothalamic-pituitary-adrenal (HPA) axis when the homeostasis of the body system is disrupted under stress. Corticosterone is known to disturb the immune system, damage the stress control circuit and cause mental disorders such as depression when it is over-secreted.

Therefore, it can be seen that the strain of *Bifidobacterium animalis* subsp. *lactis HEM*20-01 of the present disclosure reduces blood corticosterone levels and thus has the effect of treating depression.

In an embodiment of the present disclosure, the strain may reduce endotoxin, specifically, blood endotoxin levels.

Through the whole document, the term "endotoxin" is a component of the exterior membrane of Gram-negative bacteria and is known to interact with immune cells in vivo and cause inflammation. Endotoxin is chemically referred to as lipopolysaccharide (LPS). Endotoxin exposure initiates an immediate immune response, and as a result of the immune response, various inflammatory cells are gathered in the infected (exposed) tissue and immune mediators (cytokines) are secreted. If such inflammation occurs excessively, it may cause endotoxemia, which may lead to death. According to previous preclinical and clinical studies, it is known that inflammatory markers are strongly correlated with major depressive disorder.

Therefore, the strain of *Bifidobacterium animalis* subsp. *lactis* HEM20-01 of the present disclosure reduces blood endotoxin levels. Therefore, the strain has the effect of significantly improving the inflammatory markers affecting the whole body. Thus, it can be seen that the strain has the effect of treating depression.

In an embodiment of the present disclosure, the strain may alleviate intestinal permeability. Specifically, the strain may increase the expression levels of tight junction proteins ZO-1 and occludin to alleviate intestinal permeability.

Through the whole document, the term "tight junction" is a type of cell junction that blocks transfer of cells or materials between two connected cells, and the cell membranes of adjacent cells are partially fused by tight junction proteins. In the intestine, to suppress the diffusion of toxins and harmful antigens from the intestinal epithelial cells, an adsorption protein complex is formed at the apical end of the intestinal epithelial cells, and when the intestinal epithelial cells are damaged by external stimuli such as toxins, the tight junction is changed. Thus, the permeability is increased and the adhesion of intestinal walls is decreased.

Through the whole document, the term "intestinal permeability" refers to the material permeability of the intestinal wall, i.e., the permeability of the intestinal wall formed by the intestinal epithelial lining between the intestinal lumen and its surroundings. It is important in properly maintaining a balance between introduction of essential nutrients into the body and exclusion of toxic materials such as endotoxin. The intestinal permeability can be specified by known intestinal permeability assays and/or marker assay of the surface epithelial integrity of adhesion molecules, immunity or inflammation biomarkers, or bacterial markers such as endotoxin. Further, the intestinal permeability may be related to various diseases, such as septicemia and liver diseases including non-alcoholic fatty liver disease (NAFLD), non-alcoholic steatohepatitis (NASH), and hepatic cirrhosis (e.g., alcoholic liver cirrhosis), as well as intestinal disorders, such as enterocolitis (e.g., necrotizing enterocolitis) and ischemic colitis.

Therefore, it can be seen that the strain of *Bifidobacterium animalis* subsp. *lactis* HEM20-01 of the present disclosure alleviates the intestinal permeability and thus reduces the inflow of endotoxin into the bloodstream and improves the inflammatory markers.

In an embodiment of the present disclosure, the strain may reduce pro-inflammatory cytokines. Specifically, the strain may reduce the expression levels of pro-inflammatory cytokines in the intestine and hippocampus.

Therefore, it can be seen that the strain of *Bifidobacterium animalis* subsp. *lactis* HEM20-01 of the present disclosure affects the whole body by reducing pro-inflammatory cytokines in the intestine and hippocampus and improves the inflammatory markers strongly correlated with major depressive disorder and thus has the effect of treating or preventing depression.

In an embodiment of the present disclosure, the strain may treat, prevent or alleviate depression. Specifically, the strain may be contained in various compositions such as pharmaceutical compositions, food compositions, health functional food compositions, and the like for improving the intestinal environment or treating intestinal diseases.

A second aspect of the present disclosure provides a food composition for preventing or alleviating depression, comprising a strain of *Bifidobacterium animalis* subsp. *lactis* HEM20-01 (KCTC14143BP) or its culture fluid as an active ingredient. The features described above in respect of the first aspect of the present disclosure may equally apply to the food composition according to the second aspect of the present disclosure.

Through the whole document, the term "alleviate" refers to all activities improving or making better the intestinal environment by administering the composition.

In an embodiment of the present disclosure, the composition may prevent or alleviate depression. Specifically, the composition may prevent or alleviate depression by reducing corticosterone, endotoxin and pro-inflammatory cytokines.

In an embodiment of the present disclosure, the composition may contain the strain of *Bifidobacterium animalis* subsp. *lactis* HEM20-01, live bacteria, heat-killed bacteria, culture fluid, fragments and/or extracts thereof.

Through the whole document, the term "heat-killed bacteria" is opposite to the term "live bacteria" and refers to bodies obtained by suppressing the growth of bacteria such as heat-treating live bacteria obtained by fermentation and metabolites thereof. The heat-killed bacteria may contain cytoplasm, cell wall, antibacterial substances such as bacteriocin, polysaccharides, organic acid, and the like. Products using the heat-killed bacteria have higher stability than live bacteria products and are particularly excellent in heat resistance and have high stability to the external environment. Therefore, the products using the heat-killed bacteria are easier to store and have longer shelf life than the existing live bacteria products. Further, since the regulations on the use of antibiotics become stricter, there are a handful of companies that have produced heat-killed bacteria products. Therefore, considering the application as substitutes and the number of the producing companies, the marketability and growth potential is very high.

Through the whole document, the term "culture fluid" refers to a substance obtained by culturing the strain of the present disclosure in a known liquid medium or solid medium and may be interchangeably used with "cultured product".

Through the whole document, the term "food" may include meats, sausages, breads, chocolates, candies, snacks, cookies, pizza, ramens, other noodles, gums, dairy products including ice cream, soups, beverages, teas, drinks, alcohol drinks, vitamin complexes, health functional foods and health foods, and may include all foods in the accepted meaning.

Through the whole document, the term "health functional food" refers to foods prepared and processed using raw materials or ingredients having useful functions to the human body in accordance with the Health Functional Food Act, No. 6727, and the "functionality" refers to adjusting nutrients on a structure and a function of the human body or obtaining a useful effect for health such as a physiological action.

The food of the present disclosure can be manufactured by conventional methods used in the art, and can be manufactured by adding conventional raw materials and ingredients used in the art. Further, a formulation of the food is not limited as long as the formulation is accepted as a food. The food composition of the present disclosure may be prepared in a variety of formulations. Since the food is used as raw materials, unlike general drugs, the food composition is free from side effects which may occur when a drug is taken for a long time, and may have excellent portability. Therefore, the food of the present disclosure may be taken as a supplement for enhancing the effects of improving the intestinal environment.

The health food refers to a food having effects of actively maintaining or promoting health conditions, as compared with general foods, and a health supplement food refers to a food for supplementing health. If necessary, the health functional food, health food and health supplement food may be interchangeably used with each other. Specifically, the health functional food is a food prepared by adding the strain of *Bifidobacterium animalis* subsp. *lactis* HEM20-01 of the present disclosure to food materials such as beverages, teas, spices, gums, confectionery, etc., or prepared in a capsule, a powder or a suspension form. The health functional food means that it has a specific effect on health when consumed, but unlike general drugs, the health functional food is free from side effects that may occur when a drug is taken for a long time since the food is used as raw materials.

Since the food composition of the present disclosure can be routinely ingested, the food composition is expected to show a high efficacy in alleviating depression and thus can be very usefully applied.

The food composition may further contain a physiologically acceptable carrier. The kind of the carrier is not particularly limited. Any carrier may be used as long as it is commonly used in the art.

Further, the food composition may further contain additional ingredients that are commonly used in food compositions so as to improve smell, taste, visuality, etc. For example, the food composition may contain vitamins A, C, D, E, B1, B2, B6, B12, niacin, biotin, folate, pantothenic acid, etc. Furthermore, the food composition may also contain minerals such as zinc (Zn), iron (Fe), calcium (Ca), chromium (Cr), magnesium (Mg), manganese (Mn), copper (Cu), chromium (Cr), etc. Moreover, the food composition may also contain amino acids such as lysine, tryptophane, cysteine, valine, etc.

Further, the food composition may also contain food additives, such as preservatives (potassium sorbate, sodium benzoate, salicylic acid, sodium dehydroacetate, etc.), disinfectants (bleaching powder, higher bleaching powder, sodium hypochlorite, etc.), antioxidants (butylhydroxyanisole (BHA), butylhydroxytoluene (BHT), etc.), colorants (tar color, etc.), color-developing agents (sodium nitrite, etc.), bleaching agents (sodium sulfite), seasonings (monosodium glutamate (MSG), etc.), sweeteners (dulcin, cyclemate, saccharin, sodium, etc.), flavors (vanillin, lactones, etc.), swelling agents (alum, potassium D-bitartrate, etc.), fortifiers, emulsifiers, thickeners (adhesive pastes), film-forming agents, gum base agents, antifoaming agents, solvents, improvers, etc. The additives may be selected and used in an appropriate amount depending on the type of food.

The strain of *Bifidobacterium animalis* subsp. *lactis* HEM20-01 of the present disclosure may be added as it is, or may be used in conjunction with other foods or food ingredients, and may be appropriately used according to a conventional method. The mixing amount of active ingredients may be appropriately determined depending on the purpose of use (prophylactic, health or therapeutic treatment). In general, when a food or a beverage is manufactured, the food composition of the present disclosure may be added in an amount of 50 parts by weight or less, specifically 20 parts by weight or less based on the total weight of the food or the beverage. However, when taken for the purpose of health and hygiene, the food composition may be contained in an amount below the range. In addition, since there is no safety problem, the active ingredients may be used in an amount above the range.

The food composition of the present disclosure may be used as, for example, a health beverage composition, and in this case, the health beverage composition may further contain various flavors or natural carbohydrates, as in common beverages. The natural carbohydrates may include monosaccharides such as glucose and fructose; disaccharides such as maltose and sucrose; polysaccharides such as dextrin and cyclodextrin; and sugar alcohols such as xylitol, sorbitol and erythritol. The sweeteners may be natural sweeteners such as thaumatin or a *stevia* extract; or synthetic sweeteners such as saccharin or aspartame. The natural carbohydrate may be generally used in an amount of from about 0.01 g to about 0.04 g, and specifically, from about 0.02 g to about 0.03 g based on 100 mL of the health beverage composition of the present disclosure.

In addition, the health beverage composition may contain various nutrients, vitamins, minerals, flavors, colorants, pectic acid and salts thereof, alginic acid and salts thereof, organic acid, protective colloidal thickeners, pH regulators, stabilizers, antiseptics, glycerin, alcohols or carbonating agents. Moreover, the health beverage composition may contain fruit flesh used to prepare natural fruit juices, fruit juice beverages or vegetable beverages. These ingredients may be used individually or in combination. A proportion of the additives is not critical, but is generally selected from 0.01 part by weight to 0.1 part by weight per 100 parts by weight of the health beverage composition of the present disclosure.

The food composition of the present disclosure may contain the strain of *Bifidobacterium animalis* subsp. *lactis* HEM20-01 of the present disclosure in a variety of % by weight as long as it can exhibit the effect of improving the intestinal environment. Specifically, the strain of *Bifidobacterium animalis* subsp. *lactis* HEM20-01 of the present disclosure may be contained in an amount of 0.00001% by weight to 100% by weight or 0.01% by weight to 80% by weight based on the total weight of the food composition, but is not limited thereto.

In an embodiment of the present disclosure, the food composition may be a health functional food composition.

A third aspect of the present disclosure provides a pharmaceutical composition for treating or preventing depression, comprising a strain of *Bifidobacterium animalis* subsp. *lactis* HEM20-01 (KCTC14143BP) or its culture fluid as an active ingredient. The features described above in respect of the first and second aspects of the present disclosure may equally apply to the pharmaceutical composition according to the third aspect of the present disclosure.

In an embodiment of the present disclosure, the composition may contain the strain of *Bifidobacterium animalis* subsp. *lactis* HEM20-01, live bacteria, heat-killed bacteria, culture fluid, fragments and/or extracts thereof.

Through the whole document, the term "treat" refers to all activities reducing or alleviating symptoms of depression by administering a pharmaceutical composition containing the strain of *Bifidobacterium animalis* subsp. *lactis* HEM20-01 of the present disclosure as an active ingredient to a subject with depression.

In an embodiment of the present disclosure, the composition may treat or prevent depression. Specifically, the composition may treat or prevent depression by reducing corticosterone, endotoxin and pro-inflammatory cytokines.

In an embodiment of the present disclosure, the pharmaceutical composition may be formulated and used as formulations for oral administration such as powders, granules, tablets, capsules, suspensions, emulsions, syrups or aerosol, external preparations, suppositories or sterile injection solutions by conventional methods, respectively, but is not limited thereto.

In an embodiment of the present disclosure, the pharmaceutical composition may be formulated with generally used diluents or excipients such as fillers, bulking agents, binders, wetting agents, disintegrating agents or surfactants, but is not limited thereto.

In an embodiment of the present disclosure, solid formulations for oral administration may include tablets, pills, powders, granules or capsules, and these solid formulations may be prepared by mixing heat-killed bacteria of the strain with at least one of excipients such as starch, calcium carbonate, sucrose, lactose or gelatin. Except for the simple excipients, lubricants such as magnesium stearate or talc may be used, but the present disclosure may not be limited thereto.

In an embodiment of the present disclosure, liquid formulations for oral administration may include suspensions, solutions for internal use, emulsions and syrups, and may contain various excipients such as wetting agents, sweeteners, aromatics and preservatives in addition to generally used simple diluents such as water and liquid paraffin, but are not limited thereto.

In an embodiment of the present disclosure, formulations for parenteral administration may include sterilized aqueous solutions, water-insoluble excipients, suspensions, emulsions, lyophilized preparations and suppositories, but are not limited thereto. For example, the water insoluble excipients or suspensions may contain propylene glycol, polyethylene glycol, vegetable oil such as olive oil, injectable ester such as ethylolate, and the like, but are not limited thereto. For example, the suppositories may contain witepsol, macrogol, tween 61, cacao butter, laurin butter, glycerol, gelatin, and the like, but are not limited thereto.

The pharmaceutical composition according to an embodiment of the present disclosure may be a drug composition or a quasi-drug composition.

Through the whole document, the term "quasi-drug" refers to an article having a milder action than drugs, among articles being used for the purpose of diagnosis, treatment, improvement, alleviation, handling or prevention of human or animal diseases. For example, according to the Pharmaceutical Affairs Law, the quasi-drugs are those, excluding articles used as drugs, including articles used for the purpose of treating or preventing human or animal diseases and articles which have a mild action on or have no direct influence on the human body.

The quasi-drug composition of the present disclosure may be manufactured in a formulation selected from the group consisting of body cleanser, sanitizer, detergent, kitchen cleanser, detergent for cleaning, toothpaste, mouthwash, wet wipe, cleanser, soap, hand soap, hair cleanser, hair softener, humidifying filler, mask, ointment or filter filler, but is not limited thereto.

In an embodiment of the present disclosure, the pharmaceutical composition may be administered in a pharmaceutically effective amount. Through the whole document, the term "pharmaceutically effective amount" refers to an amount sufficient to treat or prevent diseases at a reasonable benefit/risk ratio applicable to any medical treatment or prevention. An effective dosage level may be determined depending on factors including severity of the disease, drug activity, a patient's age, body weight, health conditions, gender, sensitivity to the drug, administration time, administration route, and excretion rate of the composition of the present disclosure, duration of treatment, drugs blended with or co-administered with the composition of the present disclosure, and other factors known in the medical field. The pharmaceutical composition of the present disclosure may be administered individually or in combination with an ingredient known for treating intestinal diseases. It is important to achieve the maximum effect with the minimum dose without side effects by considering all of the above-described factors.

In an embodiment of the present disclosure, an administration dose of the pharmaceutical composition may be determined by a person with ordinary skill in the art in view of purpose of use, severity of the disease, a patient's age, body weight, gender, medical history or the kind of a material used as an active ingredient. For example, the pharmaceutical composition of the present disclosure may be administered at a dose of from about 0.1 ng/kg to about 1,000 mg/kg, and preferably, from about 1 ng/kg to about 100 mg/kg per adult, and the administration frequency of the composition of the present disclosure is not particularly limited, but the composition may be administered once a day or several times a day in divided doses. The administration dose or the administration frequency does not limit the scope of the present disclosure in any aspect.

The pharmaceutical composition of the present disclosure may be administered via, but not particularly limited to, intraperitoneal administration, intravenous administration, intramuscular administration, subcutaneous administration, intradermal administration, transdermal patch administration, oral administration, intranasal administration, intrapulmonary administration, rectal administration, etc. depending on the purpose. However, when the pharmaceutical composition is administered via oral administration, it can be administered in an unformulated form, and since the strain of *Bifidobacterium animalis* subsp. *lactis* HEM20-01 can be denatured or degraded by gastric acid, the composition for oral administration may be coated with an active drug, formulated to be protected from degradation in the stomach, or formulated in the form or an oral patch. Also, the composition may be administered by any device capable of delivering an active ingredient to a target cell.

Hereinafter, the present disclosure will be explained in more detail with reference to Examples. However, the following Examples are illustrative only for better understanding of the present disclosure but do not limit the present disclosure.

MODE FOR CARRYING OUT THE INVENTION

Example 1: Confirmation of Ability to Promote Production of Short-Chain Fatty Acid of *Bifidobacterium animalis* Subsp. *Lactis* HEM20-01

To verify the ability to promote production of short-chain fatty acid of a novel strain, *Bifidobacterium animalis* subsp. *lactis* HEM20-01 of the present disclosure, a test was conducted as described below. Under the provisions of the Budapest Treaty on the International Recognition of the Deposit of Microorganisms for the Purposes of Patent Procedure, novel strain *Bifidobacterium animalis* subsp. *lactis* HEM20-01 was deposited with the international depositary authority: Korean Collection for Type Cultures at Korean Research Institute of Bioscience & Biotechnology on Feb. 21, 2020 under the accession number KCTC14143BP.

Example 1-1: In Vitro Culture for Analysis of Short-Chain Fatty Acid Production

In order to check the amount of short-chain fatty acid produced by the strain of the present disclosure under in vitro conditions, the strain was cultured as follows.

First, an intestinal environment-like medium of the following composition was prepared, followed by substitution for 24 hours in an anaerobic chamber (Whitley A95 anaerobic workstation). Thus, the medium was brought into an anaerobic state.

Intestinal environment-like medium: 60 mM NaCl, 40 mM $NaHCO_3$, 10 mM KCl, $5 \times 10^{-5}$ g/L Hemin, 0.5% (w/v) mucin, 0.05% (w/v) L-cysteine HCl To each well of a 96-well plate for a test group (HEM20-01), 30 μl of the strain at a concentration of $5 \times 10^7$ CFU/ml, 180 μl of an intestinal environment-like medium, and 15 mg of a human fecal sample were dispensed, and to each well for a control group NC (Negative Control), 210 μl of an intestinal environment-like medium and 15 mg of a human fecal sample were dispensed. The strain HEM20-01 for the test group refers to *Bifidobacterium animalis* subsp. *lactis* HEM20-01.

Then, the 96-well-plate for the test group was cultured with stirring using a stirrer (DLAB mx-m) in an anaerobic chamber (Whitley A95 anaerobic workstation) for 18 hours, followed by centrifugation at 3800 rpm for 10 minutes to transfer 100 μl of supernatant of each well to a 96-well cell culture plate. Thereafter, 100 μl of a GC (gas chromatography) extraction solution [GC extraction solution composition: 10 ml of DW, 3.3 g of NaCl, 50 μl of phosphoric acid and 0.5 μl of 2-ethyl butyric acid] for metabolite extraction, 50 μl of DW and 500 of the supernatant of the 96-well cell culture plate were dispensed to each of 96 GC vials. Then, acetate, propionate, butyrate and isobutyrate, which are microbial metabolites, were assayed by gas chromatography (FIG. 1).

Example 1-2: Confirmation of Ability to Promote Butyrate Production

Quantitative variations of butyrate as a result of treatment with the novel strain were checked by gas chromatography as performed in Example 1-1.

As a result of checking the increase or decrease of butyrate, it was confirmed that butyrate was not produced when the strain HEM20-01 was cultured alone, but the ratio of butyrate was significantly increased when treated together with the intestinal environment-like medium and the human fecal sample (FIG. 1).

Based on the above result, it was found that the strain HEM20-01 of the present disclosure cannot produce butyrate by itself, but has the function of promoting butyrate production in the intestinal environment (gut microbiota).

Depression Animal Model Selection

It has been reported that BALB/c mice have anxiety-related behaviors compared with mice of the other genetic species and respond most consistently in depression-related behavior tests (Crawly, 2008; Jacobson and Cryan, 2007; Satori et al., 2011). Therefore, BALB/c mice were selected as a depression animal model, and 27 seven-to eight-week old mice (female: 14, male: 13) were divided into 14 mice for a stress control group (female: 7, male: 7) and 13 mice for a lactic acid bacteria-administered group (female: 7, male: 6) as shown in Table 1 below, and a test was performed.

TABLE 1

| Group | Treatment | Number of animals |
| --- | --- | --- |
| Stress control group | 1XPBS 200 μl/day | 14 |
| Lactic acid bacteria-administered group | B. lactis HEM20-01 $1 \times 10^9$ CFU/200 μl/day | 13 |

After a 1-week period of adaptation to oral administration, B. lactis HEM20-01 was administered to the mice for a total of 3 weeks. After a 1-week depression behavior test, the animals were sacrificed at week 5 (Table 2).

TABLE 2

| Week 0 | Week 1 | Week 2 | Week 3 | Week 4 | Week 5 |
| --- | --- | --- | --- | --- | --- |
| Period of adaptation to oral administration | Oral administration of lactic acid bacteria | Oral administration of lactic acid bacteria | Oral administration of lactic acid bacteria | Depression behavior test | Animal sacrifice |

Tissue Assay

At the time of animal sacrifice, the hippocampus, which controls emotion and memory, was extracted, and the expression levels and protein levels of depression-related immune markers were checked by quantitative real-time polymerase chain reaction (qRT-PCR) and enzyme-linked immunosorbent assay (ELISA). Further, the colon and the distal ileum, which are responsible for intestinal immunity, were extracted, and immune markers were checked by qRT-PCR. Blood was collected, and the levels of stress-related hormones were checked by ELISA, and changes of endotoxin were observed.

Example 2: Confirmation of Alleviation of Depression-Related Behavior by Bifidobacterium animalis Subsp. Lactis HEM20-01

To verify the effect of the novel strain, Bifidobacterium animalis subsp. lactis HEM20-01 (Depository Institution: Korean Collection for Type Cultures at Korean Research Institute of Bioscience & Biotechnology, Accession Number: KCTC14143BP and Date of Deposit: Feb. 21, 2020), of the present disclosure on treating depression, a test was conducted as described below (Table 3).

TABLE 3

| Depression-related behavior test | Target depression symptom |
| --- | --- |
| Sucrose preference test | Anhedonia |
| Novelty-suppressed feeding test | Anhedonia |
| Splash test | Self-care |
| Elevated plus maze test | Anxiety |
| Tail suspension test | Despair |
| Forced swim test | Despair |

Example 2-1: Sucrose Preference Test

In order to measure anhedonia among various depression-related symptoms for diagnosis of major depressive disorder, a sucrose preference test was performed. The sucrose preference test was based on a healthy mouse's natural preference for sweets, with the assumption that a depressive mouse exhibits decreased preference for sweets.

The mice got two bottles: one with a 1% sucrose solution and one with normal tap water. The mice were trained to be adapted to the positions of the two bottles which were switched every 24 hours for 2 days, and then induced to be thirsty by removing all the bottles for 24 hours. On the day of the test, the water bottle and the sucrose solution bottle were given and water intake was measured during the first 5 hours of the daytime, the entire daytime, and the entire night time to compare the sucrose solution intake between the stress control group and the B. lactis HEM20-01-administered group.

As a result, it was confirmed that the sucrose solution intake during the first 5 hours of the daytime was significantly increased in the B. lactis HEM20-01-administered group compared with the stress control group. This significant increase was observed throughout the daytime (light cycle), and there was no significant difference between the two groups during the night time when the mice were more active. As a result of measurement for 24 hours, it was confirmed that the sucrose solution intake was significantly improved in the *B. lactis* HEM20-01-administered group (FIGS. 2A-2D).

Based on the above result, it can be seen that the strain of *B. lactis* HEM20-01 according to the present disclosure is effective in alleviating anhedonia.

Example 2-2: Novelty-Suppressed Feeding Test

In order to measure anhedonia among various depression-related symptoms for diagnosis of major depressive disorder, a novelty-suppressed feeding test was performed. The novelty-suppressed feeding test was performed with the assumption that a depressive mouse reaches the feed later and eat less than a healthy mouse.

The mice were feed deprived for 24 hours and then placed in a novel arena containing a feed in the middle to measure how quickly the mice overcome anxiety and vigilance and reach the feed (latency to feed) and how much the mice eat the feed during a predetermined period of time (feed pellet consumption).

Figure 3A:
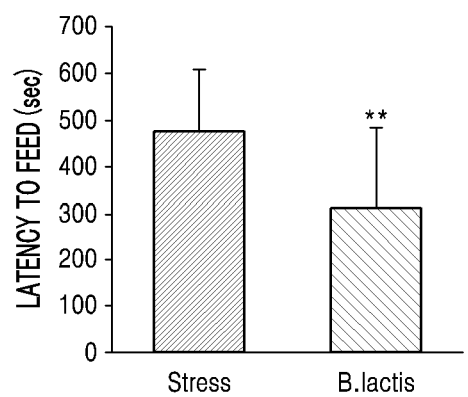
FIGS. 3A-3B show the results of novelty-suppressed feeding tests to confirm the ability to alleviate depression-related behaviors.
Figure 3B:
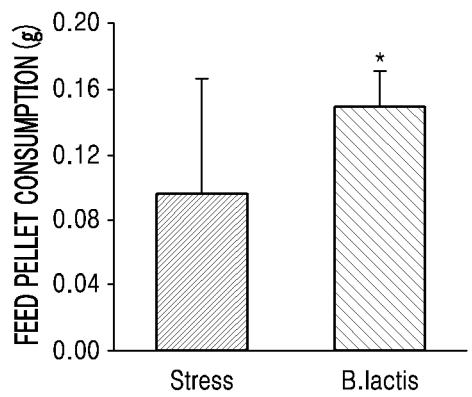

As a result, it was confirmed that the latency to feed in the novel arena was significantly shorter in the *B. lactis* HEM20-01-administered group than in the stress control group, and the feed pellet weight was significantly greater in the *B. lactis* HEM20-01-administered group than in the stress control group (FIGS. 3A-3B). Based on the above result, it can be seen that the strain of *B. lactis* HEM20-01 according to the present disclosure is effective in alleviating anhedonia.

Example 2-3: Splash Test

In order to measure self-care among various depression-related symptoms for diagnosis of major depressive disorder, a splash test was performed. The splash test was performed with the assumption that a depressive mouse shows an increased latency to grooming and a decreased grooming duration compared with a healthy mouse.

The mice were splashed with a 10% sucrose solution, and then the duration of grooming was measured for 5 minutes.

Figure 4A:
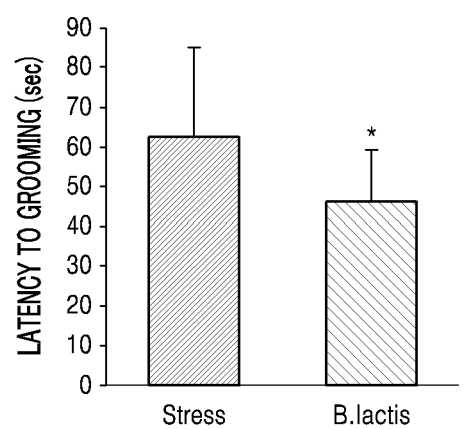
FIGS. 4A-4B show the results of splash tests to confirm the ability to alleviate depression-related behaviors.
Figure 4B:
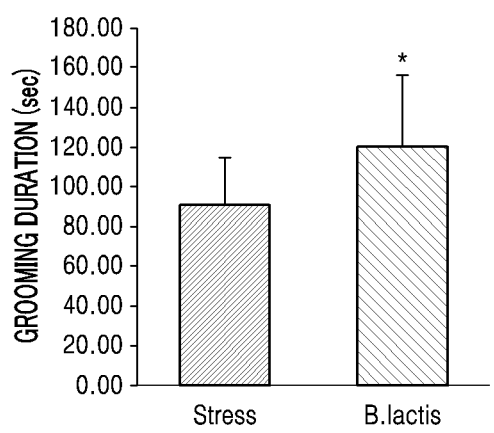

As a result, it was observed that the *B. lactis* HEM20-01-administered group showed a significant decrease in latency to grooming and a significant increase in grooming duration (FIGS. 4A-4B).

Based on the above result, it can be seen that the strain of *B. lactis* HEM20-01 according to the present disclosure is effective in improving self-care.

Example 2-4: Elevated Plus Maze Test

In order to measure anxiety among various depression-related symptoms for diagnosis of major depressive disorder, an elevated plus maze test was performed. An elevated plus maze is located 50 cm above the ground and has two open arms and two closed arms that extend from the center. The mice were placed in the center of the elevated plus maze and observed for 5 minutes. It is known that a healthy mouse stays longer in an open arm with curiosity rather than anxiety, whereas a depressive mouse stays longer in a closed arm.

Figure 5A:
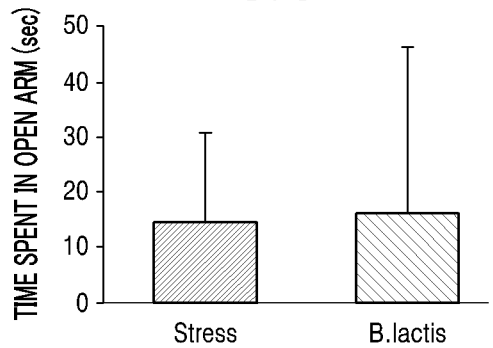
FIGS. 5A-5C show the results of elevated plus maze tests to confirm the ability to alleviate depression-related behaviors.
Figure 5B:
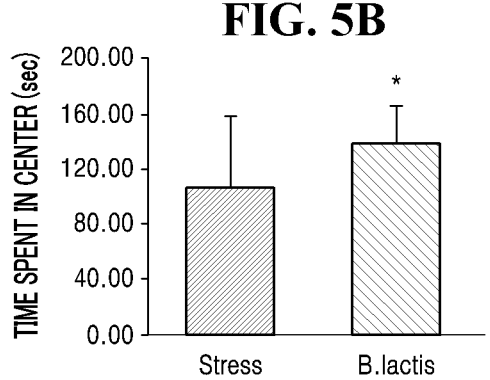
Figure 5C:
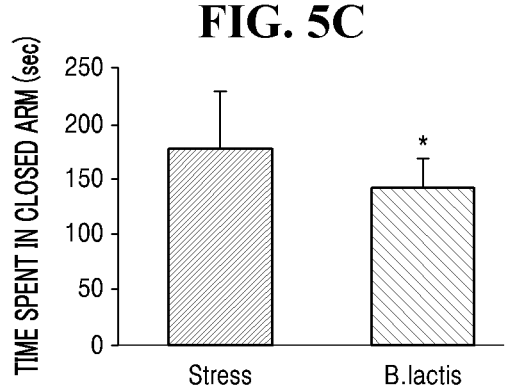

According to the test result, the *B. lactis* HEM20-01-administered group showed a tendency of longer stay in the open arms, a significantly longer stay in the center, and a significantly shorter stay in the closed arms than the stress control group (FIGS. 5A-5C).

Based on the above result, it can be seen that the strain of *B. lactis* HEM20-01 according to the present disclosure is effective in alleviating anxiety.

Example 2-5: Tail Suspension Test

In order to measure despair among various depression-related symptoms for diagnosis of major depressive disorder, a tail suspension test was performed.

In the tail suspension test, each mouse was hung by attaching its tail to a stand with a height of 50 cm on a test table using adhesive tape, and behaviors of the mouse was observed for 6 minutes. It is known that a healthy mouse struggles to escape the situation, whereas a depressive mouse does not show this behavior, but exhibits a longer immobility time.

Figure 6:
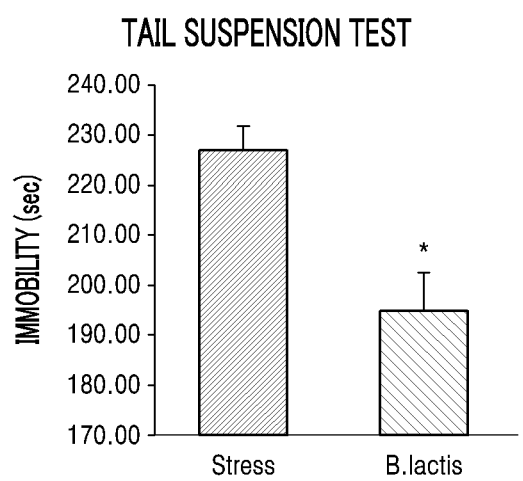
FIG. 6 shows the results of tail suspension tests to confirm the ability to alleviate depression-related behaviors.

According to the test result, the *B. lactis* HEM20-01-administered group showed a significant decrease in immobility compared with the stress control group (FIG. 6).

Based on the above result, it can be seen that the strain of *B. lactis* HEM20-01 according to the present disclosure is effective in alleviating despair.

Example 2-6: Forced Swim Test

In order to measure despair among various depression-related symptoms for diagnosis of major depressive disorder, a forced swim test was performed.

A transparent cylinder with a height of 30 cm and a diameter of 15 cm was filled with water at 25° C. to a height of about 18 cm, and the mice were forced to swim in the cylinder and behaviors thereof were observed for 6 minutes. It is known that a healthy mouse naturally swims to escape the situation, whereas a depressive mouse does not show this behavior, but exhibits immobility in water.

According to the test result, the *B. lactis* HEM20-01-administered group showed a longer latency to abandon than the stress control group (FIGS. 7A-7B).

Based on the above result, it can be seen that the strain of *B. lactis* HEM20-01 according to the present disclosure is effective in alleviating despair.

Example 3: Confirmation of Ability to Alleviate Stress Hormone

Figure 8:
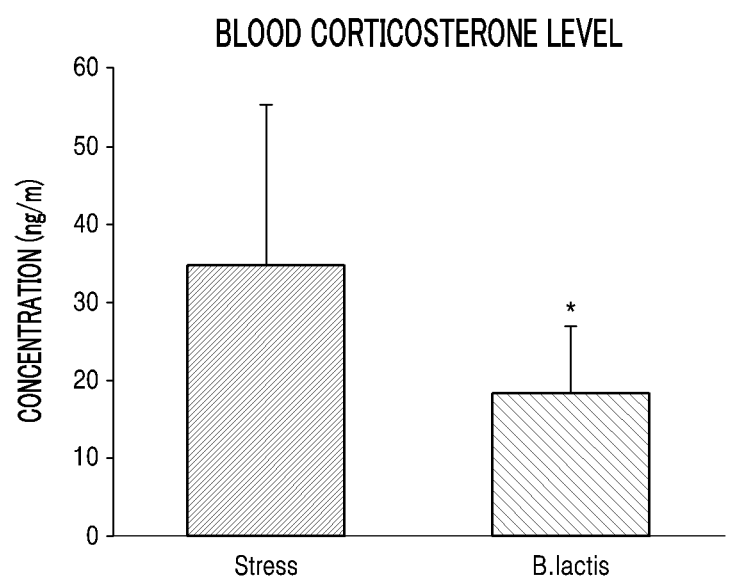
FIG. 8 shows the result of measuring blood corticosterone levels to confirm the ability to alleviate stress hormones.

Corticosterone is a stress hormone secreted from the adrenal cortex by the action of hypothalamic-pituitary-adrenal (HPA) axis when the homeostasis of the body system is disrupted under stress. In order to verify the ability of the strain of *B. lactis* HEM20-01 of the present disclosure to alleviate stress hormones, blood corticosterone levels were measured by ELISA using blood collected from the animal sacrificed at week 5. As a result, it was confirmed that the *B. lactis* HEM20-01-administered group showed a significant decrease in blood corticosterone level compared with the stress control group (FIG. 8).

Figure 9:
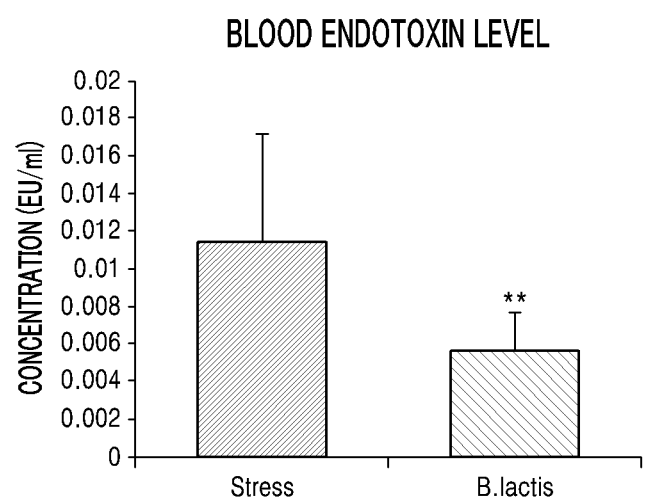
FIG. 9 shows the result of measuring blood endotoxin levels.
Figure 10A:
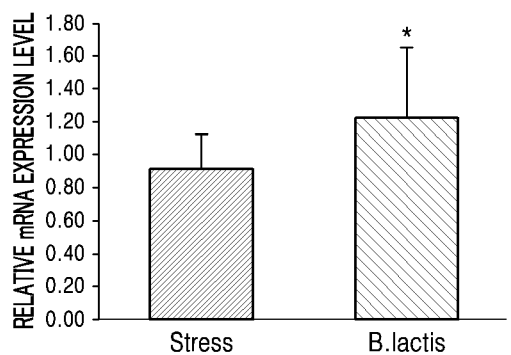
FIGS. 10A-10D show the results of checking the expression levels of distal ileum tight junction proteins and colon tight junction proteins by quantitative real-time polymerase chain reaction (qRT-PCR) in order to confirm the ability to alleviate intestinal permeability.
Figure 10B:
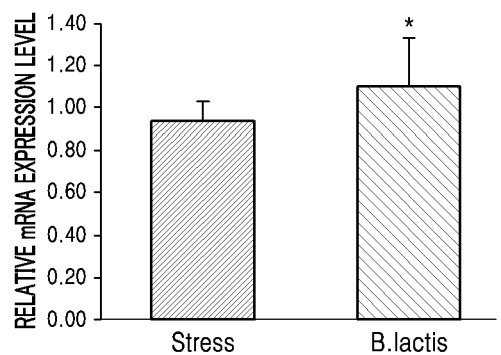
Figure 10C:
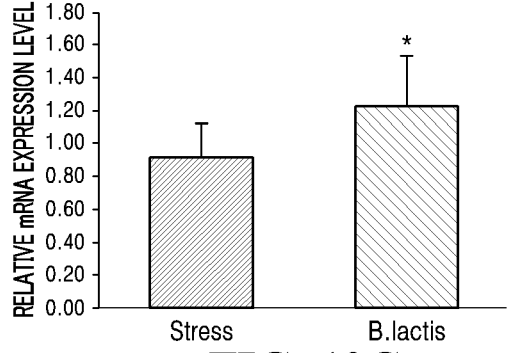
Figure 10D:
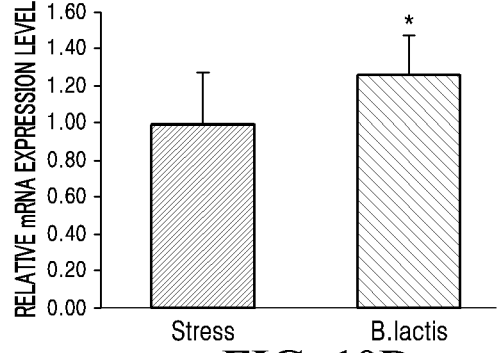
Figure 11A:
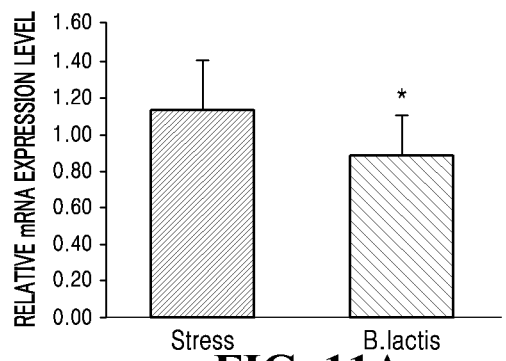
FIGS. 11A-11D and FIGS. 12A-12D show the results of checking the expression levels of pro-inflammatory cytokines (IL-1β, IL-6, TNF-α and IFN-γ) in the distal ileum and colon by qRT-PCR in order to confirm the ability to improve inflammatory markers.
Figure 11B:
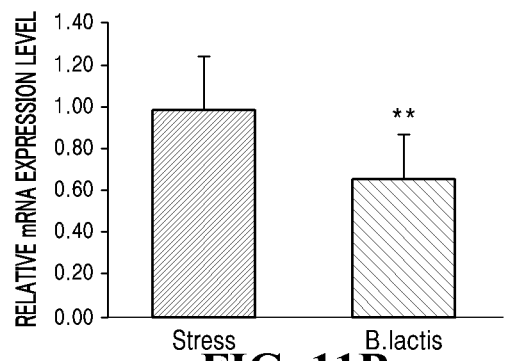
Figure 11C:
Figure 11D:
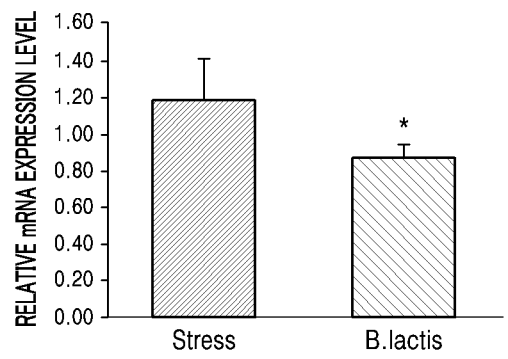
Figure 12A:
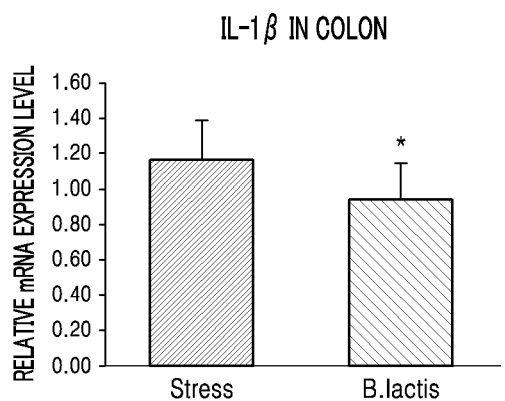
Figure 12B:
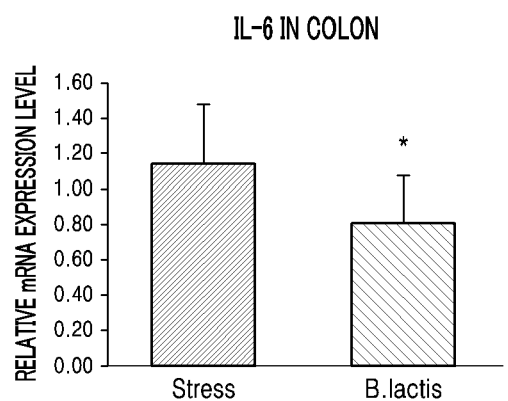
Figure 12C:
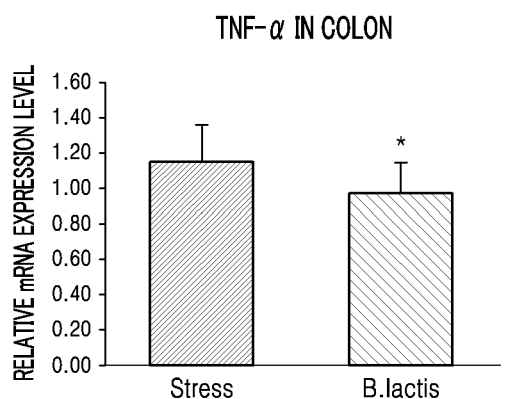
Figure 12D:
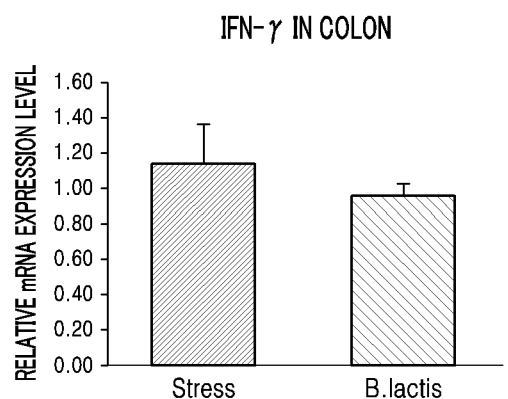
Figures 13A, 13B:
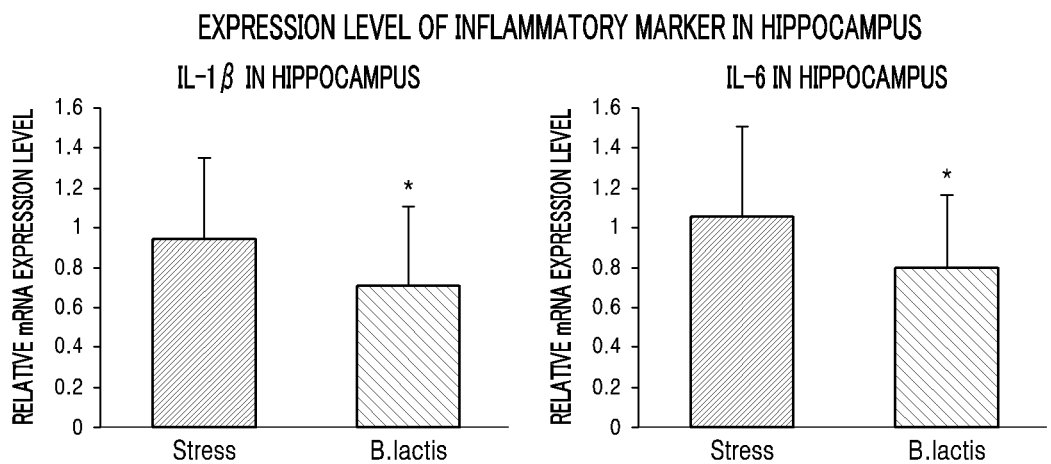
FIGS. 13A-13D show the results of checking the expression levels of pro-inflammatory cytokines (IL-1β, IL-6, TNF-α and IFN-γ) in the hippocampus by qRT-PCR in order to confirm the ability to improve inflammatory markers.
Figures 13C, 13D:
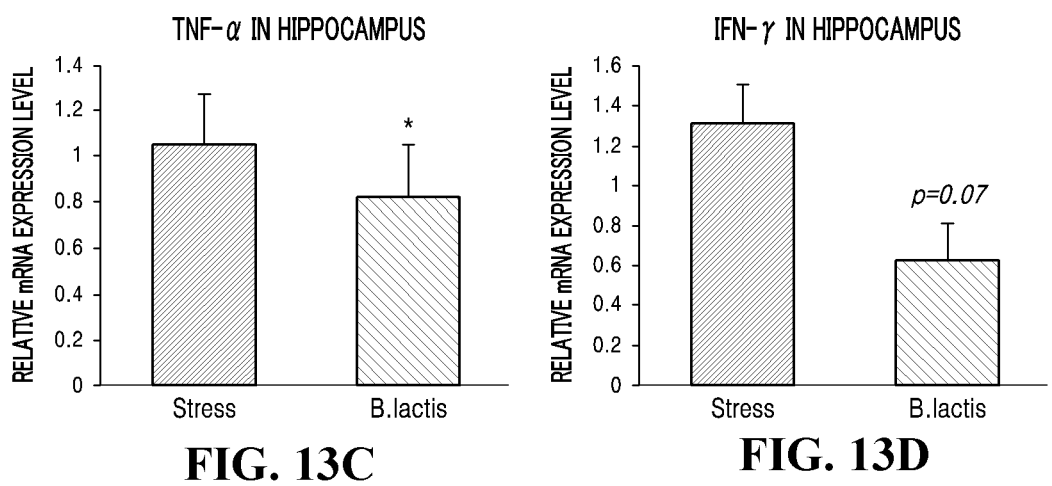

Example 4: Confirmation of Ability to Improve Blood Endotoxin Level and Intestinal Permeability Endotoxin (LPS) is known as a component of the exterior membrane of Gram-negative bacteria and known to interact with immune cells in vivo and cause inflammation. It was confirmed that the *B. lactis* HEM20-01-administered group showed a significant decrease in blood corticosterone level compared with the stress control group (FIG. 9). Since permeation through enterocytes is the main blood inlet pathway for endotoxin, the expression levels of tight junction proteins ZO-1 and occludin in the distal ileum and colon were measured by qRT-PCR. It was confirmed that the expression levels were significantly increased by administration of *B. lactis* HEM20-01 (FIGS. 10A-10D).

Based on the above result, it was confirmed that the administration of *B. lactis* HEM20-01 improved intestinal permeability and significantly improved inflammatory markers affecting the whole body.

Example 5: Confirmation of Ability to Improve Inflammatory Marker

According to previous preclinical and clinical studies, it is known that the inflammatory markers are strongly correlated with major depressive disorder. It is also known that administration of lactic acid bacteria causes intestinal anti-inflammation. When changes in expression levels of pro-inflammatory cytokines in the distal ileum and colon caused by administration of *B. lactis* HEM20-01 were measured by qRT-PCR, it was found that the expression levels of IL-1$\beta$, IL-6, TNF-$\alpha$ and IFN-$\gamma$ known as pro-inflammatory cytokines in the distal ileum were significantly decreased compared with those in the stress control group (FIGS. 11A-11D). This tendency was also observed in the colon (FIGS. 12A-12D). Therefore, it was confirmed that intestinal inflammation was significantly alleviated by administration of *B. lactis* HEM20-01, a probiotic candidate.

Figure 14A:
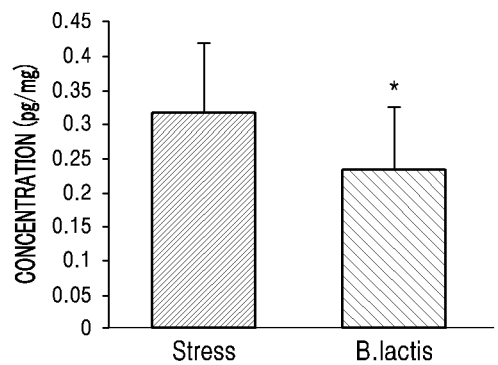
FIGS. 14A-14B show the results of checking the levels of pro-inflammatory cytokines (IL-1β and IL-6) in the hippocampus by enzyme-linked immunosorbent assay (ELISA) in order to confirm the ability to improve inflammatory markers.
Figure 14B:
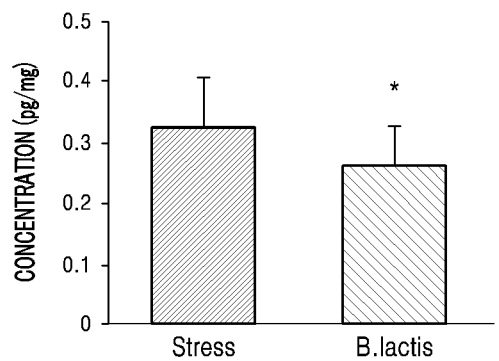

It has been reported that depression-related inflammatory markers are expressed not only in the intestine but also in the hippocampus. When the expression levels of the same pro-inflammatory cytokines in the hippocampus were checked by qRT-PCR, it was found that the expression levels of pro-inflammatory cytokines in the hippocampus were significantly decreased by administration of *B. lactis* HEM20-01 compared with those in the stress control group (FIGS. 13A-13D). Also, when the protein levels of IL-1$\beta$ and IL-6, pro-inflammatory cytokines in the hippocampal tissue, were measured by ELISA, the levels of pro-inflammatory cytokines in the hippocampus were significantly decreased by intake of *B. lactis* HEM20-01 compared with those in the stress control group B (FIGS. 14A-14B).

Therefore, improvement of systemic stress hormone levels, inflammatory markers, and depression-related behaviors as a result of administration of *B. lactis* HEM20-01 was observed from the BALB/c models, which confirmed that *B. lactis* HEM20-01 has an antidepressant effect.

The above description of the present disclosure is provided for the purpose of illustration, and it would be understood by a person with ordinary skill in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

ACCESSION NUMBER

Depository Institution: Korean Research Institute of Bioscience & Biotechnology

We claim:

1. A strain of *Bifidobacterium animalis* subsp. *lactis* HEM20-01 deposited under accession no. KCTC14143BP at the Korean Collection for Type Cultures, wherein the strain is lyophilized.

2. A food composition comprising a strain of claim 1 or its culture fluid as an active ingredient.

3. A pharmaceutical composition comprising a strain of claim 1 or its culture fluid as an active ingredient.

* * * * *